(12) United States Patent
Defilippi

(10) Patent No.: US 8,840,148 B2
(45) Date of Patent: Sep. 23, 2014

(54) ADDUCTION ASSEMBLY WITH A "T" JOINT FOR AN AIR CONDITIONING CIRCUIT

(75) Inventor: Roberto Defilippi, Turin (IT)

(73) Assignee: Dytech-Dynamic Fluid Technologies S.p.A., Turin (IT)

( * ) Notice: Subject to any disclaimer, the term of this patent is extended or adjusted under 35 U.S.C. 154(b) by 424 days.

(21) Appl. No.: 13/057,638

(22) PCT Filed: Aug. 5, 2009

(86) PCT No.: PCT/IB2009/006447
§ 371 (c)(1),
(2), (4) Date: Aug. 4, 2011

(87) PCT Pub. No.: WO2010/015912
PCT Pub. Date: Feb. 11, 2010

(65) Prior Publication Data
US 2012/0018995 A1 Jan. 26, 2012

(30) Foreign Application Priority Data
Aug. 6, 2008 (IT) .............................. TO2008A0622

(51) Int. Cl.
| | | |
|---|---|---|
| F16L 13/007 | (2006.01) | |
| F16L 41/02 | (2006.01) | |
| F16L 47/32 | (2006.01) | |
| F16L 41/00 | (2006.01) | |
| F16L 47/24 | (2006.01) | |
| G01L 19/00 | (2006.01) | |

(52) U.S. Cl.
CPC ............... *F16L 41/008* (2013.01); *F16L 47/24* (2013.01); *G01L 19/0007* (2013.01)

USPC ................ 285/286.1; 285/133.21; 285/133.3; 285/133.4; 285/293.1

(58) Field of Classification Search
USPC ................... 285/133.11, 133.21, 133.3, 133.4, 285/133.5, 286.1, 293.1, 204, 212, 220
See application file for complete search history.

(56) References Cited

U.S. PATENT DOCUMENTS

| | | | | |
|---|---|---|---|---|
| 1,110,947 | A * | 9/1914 | Lampert | 285/50 |
| 3,458,619 | A * | 7/1969 | Prochaska | 264/261 |
| 4,093,280 | A * | 6/1978 | Yoshizawa et al. | 285/39 |
| 4,560,189 | A | 12/1985 | Lang | |
| 5,109,929 | A * | 5/1992 | Spears | 169/16 |
| 5,366,257 | A * | 11/1994 | McPherson et al. | 285/148.11 |
| 6,000,436 | A * | 12/1999 | Auvil et al. | 138/143 |
| 6,540,261 | B1 * | 4/2003 | Painter et al. | 285/133.11 |
| 7,527,302 | B2 * | 5/2009 | Lewis et al. | 285/296.1 |

(Continued)

FOREIGN PATENT DOCUMENTS

| | | |
|---|---|---|
| DE | 1008967 | 5/1957 |
| DE | 3246768 | 1/1989 |

(Continued)

*Primary Examiner* — James Hewitt
(74) *Attorney, Agent, or Firm* — Gottlieb, Rackman & Reisman, P.C.

(57) ABSTRACT

A coolant adducting assembly for a climate control system of a vehicle comprises a joint and a pipe connected to the joint, wherein pipe and joint comprise a thermoplastic material and the joint comprises an insert made of a more rigid material than the thermoplastic material and has an anchoring portion co-molded into the joint and a connecting portion exiting the joint and adapted to be firmly connected to a device.

7 Claims, 3 Drawing Sheets

(56) References Cited

U.S. PATENT DOCUMENTS

| | | |
|---|---|---|
| 7,537,244 B2 * | 5/2009 | Gibson et al. ............... 285/220 |
| 2003/0030277 A1 | 2/2003 | Morohoshi |
| 2004/0155457 A1 * | 8/2004 | Mejlhede et al. ............ 285/21.1 |
| 2005/0140095 A1 | 6/2005 | Muhammad et al. |
| 2008/0299446 A1 * | 12/2008 | Kelly ............................ 429/88 |

FOREIGN PATENT DOCUMENTS

| | | |
|---|---|---|
| DE | 19608781 | 9/1996 |
| DE | 20 2005 017314 | 12/2005 |
| JP | 2007 7064250 | 3/2007 |
| JP | 2007 260957 | 10/2007 |

* cited by examiner

ADDUCTION ASSEMBLY WITH A "T" JOINT FOR AN AIR CONDITIONING CIRCUIT

TECHNICAL FIELD

The present invention relates to an adducting assembly for an air conditioning circuit of a motor vehicle comprising a "T" joint, e.g. for connecting a pressure sensor or an inlet valve.

BACKGROUND ART

The air conditioning systems of motor vehicles are circuits adduct a coolant and are formed by a plurality of components, comprising in particular a compressor, a condenser, a dryer tank, and expansion system, and an evaporator. All these components are connected to one another by means of tubular elements which have fixing elements and joining elements capable of ensuring fluid-tightness at their ends.

The constituent components of the air conditioning system are accommodated inside the engine compartment of the vehicle, with the compressor driven by the same driving shaft of the vehicle, while the other components are fixed to portions of the body. There are low pressure elements and high pressure elements in the air conditioning system. The latter may be subjected in use to coolant pressures of the order of 30 bars.

Freon gas named "R-134" has been used for a long time as coolant in cars. In order to obviate the polluting properties of such a gas, it is particularly important for a pipe intended to convey it to be substantially impermeable. Furthermore, low permeability is also desirable for the system to keep its functionality and efficiency over time.

However, international standards concerning the environment enforce seeking alternative solutions to Freon R-134 with a lower GWP (Global Warming Potential). Among these, the effectiveness of gas 1234YS proposed by Honeywell and Dupont has been proven. In all cases, even when using a gas with lower GWP as a coolant, all elements, i.e. pipes and joints intended to convey it, must have the lowest possible permeability, in combination with satisfactory high-pressure mechanical properties, in particular after aging and substantially over the entire lifecycle of the motor vehicle.

In particular, car manufacturers require that the lines formed by pipes and joints intended for conveying coolant into the air conditioning system pass a plurality of experimental tests, e.g. hot burst tests for checking the mechanical features, strength tests to cyclic pressure variations, conveyed fluid permeability tests and chemicals resistance tests.

In automotive air conditioning systems, these requirements are generally met by using aluminum piping for conveying the coolant, at the ends of which brazed flanges and intermediate rubber pipes with bell-shaped joints or quick couplings moulded on the rubber itself are used, by possibly using such a metal in combination with multi-layer rubber pipes.

However, the general trend in the automotive field is to replace the metal or rubber piping where possible with equivalent structures made of plastic, so as to promote a reduction of manufacturing costs in addition to the total weight of the resulting air conditioning system, being thus beneficial for engine $CO_2$ emissions by virtue of lower consumptions.

The systems are also provided with a sensor or other component which must be branch-connected, in particular screwed.

The need to keep the interfaces normally used in systems formed by metal or rubber piping arises when plastic pipes are used in an air conditioning circuit.

In particular, the tightening torque of the sensor is such to damage a thread made of thermoplastic material and cause coolant leakages.

OBJECT OF THE INVENTION

It is thus the object of the present invention to provide an adducting assembly capable of effectively replacing the aluminum elements currently used in air conditioning systems in the automotive field.

According to the present invention, an adducting assembly comprising a branch-coupling for an air conditioning circuit is provided according to claim 1.

BRIEF DESCRIPTION OF THE DRAWINGS

For a better understanding, the present invention will now be further described with reference to the accompanying drawings, in which in particular.

BEST MODE FOR CARRYING OUT THE INVENTION

Figure 1:
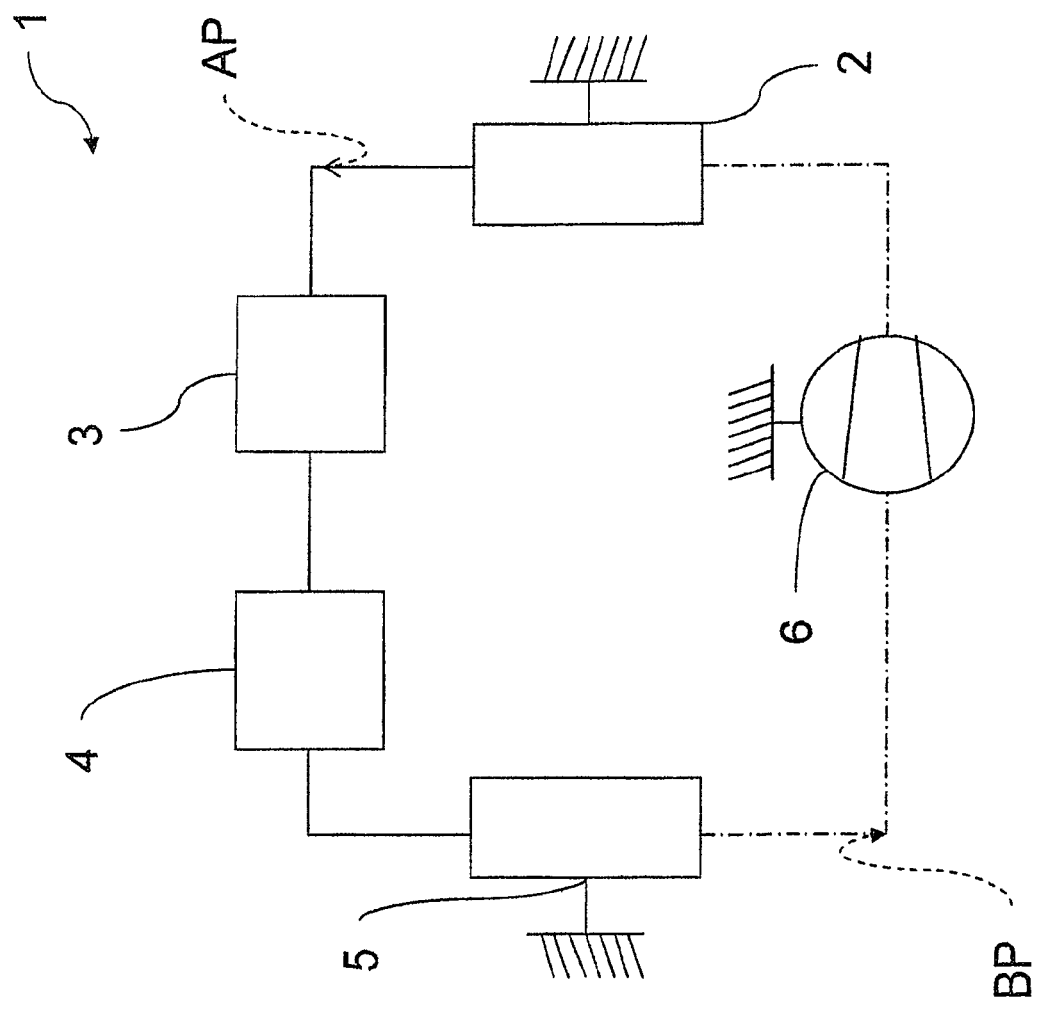
FIG. 1 is an air conditioning circuit diagram.

In FIG. 1, numeral 1 indicates as a whole an air conditioning system for a motor vehicle, comprising a condenser 2, a dryer tank 3, an expansion system 4, an evaporator 5, a compressor 6. A low pressure section BP is identified in FIG. 1 by a dashed-dotted line. A solid line indicates instead a high pressure section AP, substantially identifiable between the compressor 6 and the expansion system 4. In the high pressure section AP, the coolant (R-134) is in use at temperatures of about 100° C. and at a pressure of the order of 20 bars. The air conditioning system components outlined in FIG. 1 are connected to one another by means of a plurality of hollow components, i.e. pipes 7 and respective joints. Two pipes 7 are further joined by means of a T coupling 8 (FIG. 2), so that a pressure sensor or valve (not shown) may be branch-mounted with respect to the flow of coolant.

The joint 8 comprises a cylindrical body 9 having an axis A and a tubular portion 10 having an axis B perpendicular to axis A.

The joint 8 further comprises an insert 11 made of metal material and co-moulded in the tubular portion 10. The insert 11 comprises a co-moulding portion 12 incorporated in the tubular portion 10 and having a non-circular, e.g. hexagonal, cross section; and a threaded portion 13 protruding along the axis B with respect to the tubular bulge 10.

The co-moulding portion 12 is shaped so as to define a shape-coupling with the tubular portion 10 such to withstand both a load defined by a tightening torque applied to the threaded portion 13 and an extraction load applied in a direction parallel to axis B. The co-moulding portion 12 preferably defines an annular recess 12' filled with the matrix of the tubular portion 10 when being co-moulded.

Insert 11 further defines a channel 14 coaxial to axis B and fluidically connected to the pipes 7 of the air conditioning circuit 1.

Additionally, the joint 8 comprises a seal ring 14 mounted to a seat 15 defined by the tubular portion 10.

Figure 2:
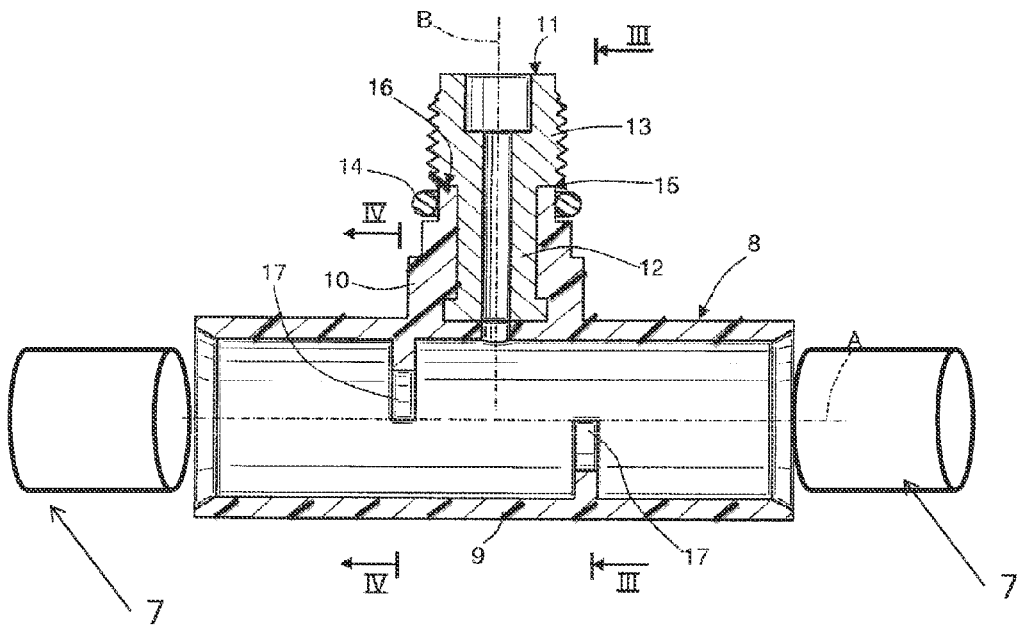
FIG. 2 is a section of a T joint of the circuit in FIG. 1.

In particular, close to the seat 15, the tubular portion 10 defines an abutment 16 for the threaded portion 13. The dimension along the axis B of the abutment 15 is larger than the maximum axial dimension of the seal ring 14 when the pressure sensor is mounted and ready to be used. For example, as shown in FIG. 2, the axial dimension of the abutment 16 is larger than the maximum dimension of the seal ring 14 also when the latter is not compressed and the sensor is removed, as shown in FIG. 2.

According to a preferred embodiment, the cylindrical body 9 is connected to the pipes 7 by laser welding. In particular, each pipe 7 connected to the insert 8 comprises an end portion inserted with radial interference into the cylindrical body 9.

Figures 3, 4:
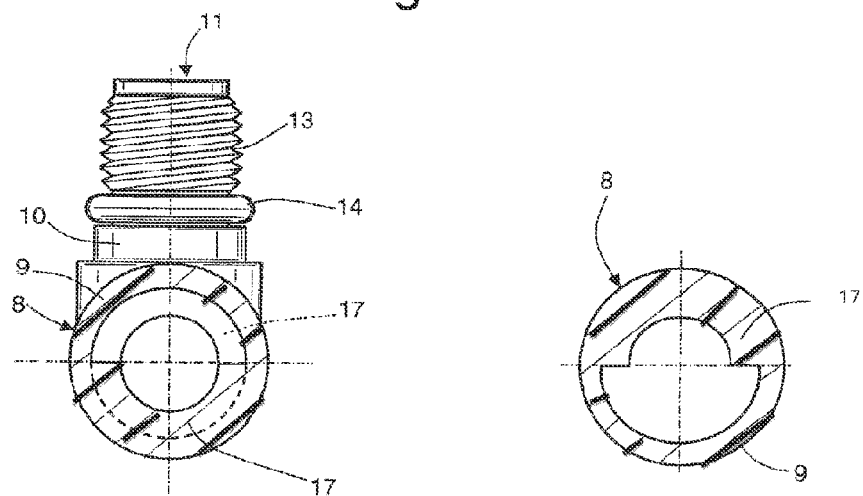
FIGS. 3 and 4 are sections taken along planes III-III and IV-IV in FIG. 2, respectively.

In order to concretely express the axial position of each pipe 9, the insert 8 comprises a corresponding radial ridge 17 exiting towards the axis A to define an axial abutment. Each ridge 17 angularly extends by less than 360° degrees, e.g. less than 180°. Furthermore, as shown in FIGS. 3, 4, the two ridges 17 are angularly offset from each another, preferably by 180° degrees. Load losses may thus be reduced.

According to a preferred embodiment, pipe 7 and joint 8 comprise a layer comprising a thermoplastic copolymer comprising a polyamide 6.10.

The layer comprising polyamide 6.10 preferably comprises more than 60% of polyamide 6.10. More preferably, the layer comprises more than 90% of polyamide 6.10. Even more preferably, the layer is completely made of polyamide 6.10.

Polyamide 6.10 preferably comprises more than 60% of a copolymer obtained from a first monomer comprising sebacic acid units and from a second monomer comprising hexamethylenediamine units. More preferably, polyamide 6.10 comprises more than 90% of a copolymer obtained from a first monomer comprising sebacic acid units and from a second monomer comprising hexamethylenediamine units. Even more preferably, polyamide 6.10 consists in a copolymer obtained from a first monomer comprising sebacic acid units and from a second monomer comprising hexamethylenediamine units.

A resin of Grilamid® S series from EMS is preferably used. For example, Grilamid® S FR5347 resin may be used.

Such a resin, having a density of about 1.07 g/cm$^3$, has a melting point of about 220° C. and a Young's modulus of about 2.3 GPa. Furthermore, an element made of such a resin has properties of high chemical resistance to oils, e.g. PAG2 or POE, fuels, water and salt solutions, good short-term heat resistance and hydrolysis resistance properties, reduced tendency to absorb water, and a better mechanical stability and resistance to abrasion, as compared to pipes made of other polyamides, such as PA6 and PA12.

Furthermore, since one of its constituent monomer units is mainly sebacic acid (a compound abundantly available in nature as obtained from castor oil), its use advantageously is a form of use of renewable resources. Joint 8 preferably comprises a fiber filler, more preferably a glass fiber filler, or a mixed glass fiber and mineral fiber filler.

The glass fibers are preferably added in an amount by weight to the polyamide between 10 and 60%. Optimal test results have been obtained with a percentage by weight between 20 and 40%, e.g. 30%.

According to a preferred embodiment of the invention, the glass fibers have a length between 0.05 and 1.0 mm, but even more preferably have a length between 0.1 and 0.5 mm.

Furthermore, these fibers preferably have a diameter between 5 and 20 μm, and more preferably have a diameter between 6 and 14 μm.

Joint 8 preferably comprises at least 60% of such a polyamide 6.10 filled with glass fibers. More preferably, joint 8 comprises at least 90% of such a polyamide 6.10 filled with glass fibers. Even more preferably, it is completely made of such a polyamide 6.10 filled with glass fibers.

According to an embodiment, the pipe 7 consists of a single layer comprising polyamide 6.10 not filled with glass fibers as described in the previous paragraphs, and preferably has a thickness between 1.5 and 3 mm.

According to an alternative embodiment of the invention, the pipe 7 may comprise a second layer comprising a polyamide resin preferably selected from polyamide 12 and copolyamide obtained from dicarboxylic units, which are terephthalic acid or isophthalic acid by more than 60%. If the pipe 7 is multi-layered, the joint is made of thermoplastic material adapted to be welded to the material of the outermost layer of pipe 7. Joint 8 preferably comprises the same thermoplastic material of which the outermost layer of pipe 7 is made.

The second layer preferably comprises at least 60% of said polyamide resin. More preferably, the second layer comprises at least 90% of said polyamide resin. Even more preferably, the second layer is completely made of said polyamide resin.

According to an embodiment of the invention, said polyamide resin is polyamide 12 modified to withstand cold impacts.

Polyamide 12 is preferably selected so as to have a melting point between 170 and 176° C., a tensile stress between 25 and 35 MPa, a flexural strength between 20 and 30 MPa, a flexural modulus between 400 and 600 MPa, an impact resistance between 100 and 120 kJ/m$^2$ at 23° C. and between 10 and 20 kJ/m$^2$ at −40° C.

The pipe preferably comprises a first layer comprising polyamide 6.10 and a second layer comprising polyamide 12, the first layer being within the second layer.

According to a further embodiment of the invention, such a copolyamide is polyphthalamide (PPA).

Such a copolyamide is preferably obtained from carboxylic units, which are terephthalic acid by more than 60%, and diamine units which are 1,9-nonanediamine or 2-methyl-1,8-octanediamine, by more than 60%.

More preferably, the dicarboxylic units are terephthalic acid by more than 90%. Even more preferably terephthalic acid is 100% of the dicarboxylic units.

The diamine units preferably are 1,9-nonanediamine or 2-methyl-1,8-octanediamine by more than 60%. More preferably, the diamine units are 1,9-nonanediamine or 2-methyl-1,8-octanediamine by more than 90%. Even more preferably, 1,9-nonanediamine or 2-methyl-1,8-octanediamine are 100% of the diamine units.

Examples of dicarboxylic units other than terephthalic acid comprise dicarboxylic aliphatic acids such as malonic acid, dimethylmalonic acid, succinic acid, glutaric acid, adipic acid, 2-methyladipic acid, trimethyladipic acid, pimelic acid, 2,2-dimethylglutaric acid, 3,3-diethylsuccinic acid, azelaic acid, sebacic acid, and suberic acid; alicyclic dicarboxylic acids such as 1,3-cyclopentanedicarboxylic and 1,4-cyclohexanedicarboxylic acid; aromatic dicarboxylic acids such as isophthalic acid, 2,6-naphthalenedicarboxylic acid, 2,7-naphthalenedicarboxylic acid, 1,3-phenylenedioxy diacetic acid, diphenic acid, 4,4'-oxydibenzoic acid, diphenylmethane-4,4'-dicarboxylic acid, diphenylsulfone-4,4'-dicarboxylic acid and 4,4'-biphenyldicarboxylic acid; or a mixture thereof.

Among these, aromatic dicarboxylic acids are preferred.

Examples of diamine units other than above-mentioned 1,9-nonanediamine and 2-methyl-1,8-octanediamine comprise aliphatic diamines, such as ethylenediamine, propylenediamine, 1,4-butanediamine, 1,6-hexanediamine, 1,8-octanediamine, 1,10-decanediamine, 3-methyl-1,5-pentanediamine; alicyclic diamines such as cyclohexanediamine, methyl cyclohexanediamine and isophoronediamine; aromatic diamines such as p-phenylenediamine, m-phenylenediamine, p-xylenediamine, m-xylenediamine, 4,4'-diaminodiphenylmethane, 4,4'-diaminodiphenylsulfone, 4,4'-diaminodiphenyl ether; and an arbitrary mixture thereof.

Such a polyamide is preferably P9T of the type described in U.S. Pat. No. 6,989,198. More preferably, the polyamide resin is a Genestar® resin from Kuraray. Even more preferably, it is a Genestar® resin from Kuraray, e.g. Genestar 1001 U03, U83.

The adducting assembly comprising joint 8 and pipe 7 according to the preceding paragraphs meets the requirements set by car manufacturers for use in air conditioning systems. In particular, the layer made of PA 6.10 is able to meet the requirements of permeability and resistance to pressure oscillations, even after aging. Furthermore, coupling the layer made of PA 6.10 with an outer layer made of PA12, PPA or P9T allows to overcome the problems related to resistance to chemical etching, thus avoiding flaking and breakage at the welding points.

In use, the seal ring 14 is compressed by the pressure sensor which is screwed onto the threaded portion 13 and avoids leakages of coolant.

In particular, the coolant may escape through two alternatively paths both in one direction or in the other with respect to axis B.

In particular, the first path starts from the zone in which the channel 14 leads into the cylindrical body 9 and runs along the co-moulding interface between the co-moulding portion 12 and the tubular portion 10 to the abutment 16.

The second path starts from the head of the threaded portion 13 and runs along the corresponding threads to reach the seal ring 14. The coolant which tends to escape along the first path is fed along a middle direction substantially opposed to that followed by the fluid which tends to escape along the second path.

The first and second paths meet upstream of the seal ring 14, i.e. close to the periphery of abutment 16. Thereby, the leakages flow into a single point and a single seal ring 14 is sufficient to prevent leakages.

EXAMPLE 1

A single layer pipe made of Grilamid S FE 5347, about 7×11, mounted to a joint 8 made of Grilamid S FE 5351 7×11 with 30% glass fibers and red coloured in order to be transparent to laser light.

The laser source is a diode source and has a maximum power of 50 W. The beam is conveyed by optical fibers and focused by means of cylindrical optics so as to generate a blade-shaped laser spot.

According to a non-limitative embodiment, joint 8 and pipe 7 overlap in the axial direction over 13 mm and the length of the laser blade is shorter than the overlapping section, e.g. the length of the blade is 11 mm.

The adducting assembly 1 is rotated on a spindle while the laser light blade stays fixed. Alternatively, the laser optics is movable, while the adducting assembly is stationary.

The primary need of a coolant adducting assembly is to avoid leakages. For this purpose, the pass speed and the beam power need to be determined once the geometry of the laser light spot has been fixed.

An excessively powerful beam would cause burns and/or bubbles along the welding area. An excessively fast pass speed could, instead, disperse the beam energy and cause lack of melting in some zones of the welding area. In both cases, the fluid-tightness of the adducting assembly is compromised.

According to the present invention, it has been checked that a rotation speed between 2 and 9 seconds per revolution, preferably 6 seconds per revolution, i.e. from 230 to 1037 mm/min, preferably 345 mm/min in combination with the laser beam having a linear power density between 2 and 3.5 kW/mm, preferably 2.7 kW/mm allow to obtain a homogenous melting of the overlapping walls of joint 8 and pipe 7, respectively, so as to obtain a continuous, bubble-free welding.

Hot Burst Tests

The tests were carried out at a temperature of 120° C., after stabilization for 1 h at the test temperature. An increasing hydraulic pressure was applied to the previously described pipe, with 5 bars/s increase until bursting of the pipe. The burst pressure is then compared with the specified values, e.g. by a car manufacturer, for use.

The test was further carried out after the pulsating pressure tests (described below), thus registering a value of 89-92 bars, again clearly over the specified 30 bars.

Permeability Tests

The objective of these tests is to measure the amount of fluid which exits through the wall of the pipes by means of weight loss. In order to obtain statistically significant data, the tests are simultaneously carried out on four pipes.

Firstly, the lengths ($L_1, L_2 \ldots L_4$) of the pipes under test, excluding the joints, are measured at atmospheric pressure. Two closing devices, one of which is provided with a filling valve, are mounted at the ends of the pipes.

The inner theoretical volume of the first 3 pipes is calculated and an amount of 0.55 g/cm$^3$ of HFC134, which is about 50% of the inner volume of the pipe under test, is introduced into the same. The absence of leakages from the closing devices is checked by means of a halogen detector.

The 4 pipes (3 full pipes plus the blank sample) are introduced into an environmental chamber at the temperature of 100° C. for 1 h, then the halogen detector check is repeated. At this point, the 4 pipes are conditioned in the environmental chamber at 100° C. for 24 h.

At the end of the this step of conditioning, the pipes are weighed and their values $P_1, P_2, \ldots P_4$ are registered.

The pipes 7 are thus conditioned again at 100° C. for 72 h, after which they are weighed and the single weight losses $\Delta P_i$ are determined. The weight loss of the pipes filled with coolant is then evaluated as an average value on the three pipes, and the value measured for the "blank" pipe is then subtracted. The resulting difference is the permeability index in g/m$^2$/72 h.

A value lower than 1.82 g/m$^2$/72 h was registered for the pipe according to the invention.

Pulsating Pressure Strength Tests

The pipes 7 under examination are mounted on a test bench provided with a device capable of sending pressure pulses. The pipes mounted in a U, with curvature radius equal to the minimum radius contemplated for the pipe under examination, are internally filled either with the lubricant provided for the compressor or with a silicone oil; the environment in which the test is conducted contains air. The inner fluid and the air are taken to a temperature of 100-120° C. and subjected to cycles with test pressure of 0±3.5 MPa (or from 0 to 1 MPa, according to the type of pipe), with a test frequency of 15 cycles per minute. At least 150,000 cycles are carried out until breakage if this does not occur within the 150,000 cycles.

At the end, a check cycle is run, by removing the pipe from the test bench, submerging it in water, and sending a pneumatic pressure of 3.5 MPa for 30 s to check for the lack of leakages. If the presence of bubbles is found, the pressure is kept for 5 minutes in order to ascertain that it is in fact a leakage and not, for example, air possibly trapped between the layers of the pipe (in the case of a multi-layer pipe).

Upon completion of the test, the pipe samples are cut at the joined end zones and visually examined to ascertain the lack of tearing on the inner conduit. The presence of this type of defect would cause test failure.

No breakage occurred after 150,000 cycles for the pipe according to the invention.

Extraction Tests

The tests are carried out at ambient temperature and after a 1 h permanence at 150° C. at a traction speed of 25 mm/min. The average value of the extraction load which in all cases caused the pipe breakage is 2470 N for the test at ambient temperature and 1172N for the test carried out when hot.

Only the adducting assemblies according to the invention pass all the tests needed to ensure a sufficient duration of the pipe according to the requests of car manufacturers.

The advantages that the joint and the adducting assembly 1 according to the present invention allow to obtain are as follows.

The insert 11 co-moulded onto the joint 8 made of thermoplastic material ensures that the assembly torques required for metal and rubber piping may be applied. These torques are between 4 and 20 Nm, normally 8 Nm.

Laser welding for connecting pipe 7 and joint 8 made of plastic material is adapted to meet the requirements of mechanical tightness and permeation required by car manufacturers for supply approval. Thereby, the aluminum pipes may be replaced, thus reducing weights and costs.

The seal ring 14 is single and ensures tightness for the leakages potentially caused by the insert 11.

It is finally apparent that changes and variations mat be made to the adducting assembly described and illustrated herein without therefore departing from the scope of protection defined by the appended claims.

Figure 5:
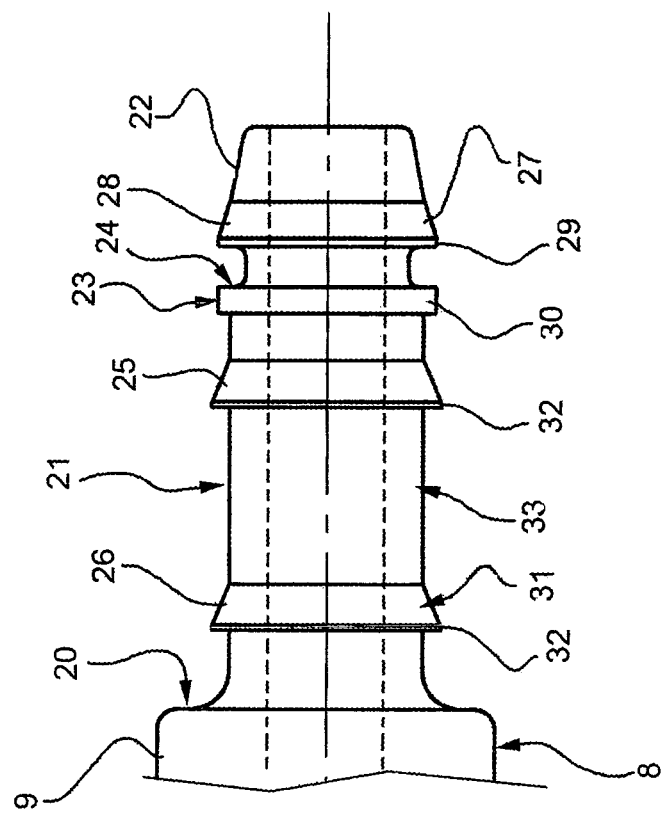
FIG. 5 is a side view of a detail of a T joint according to a further embodiment.

In particular, as shown in FIG. 5, joint 8 may be connected by means of two interference couplings to the pipes 7.

In this case, the cylindrical body has an axial abutment 20 for defining the position of the pipes 7 and an end portion 21 insertable into the respective pipe 7.

The end portion 21 comprises, in order, a truncated cone mouth portion 22, a portion 23 defining a seat 24 for a seal ring (not shown), an annular ridge 25 adjacent to the portion 23 and an annular ridge 26 adjacent to the abutment 20.

In particular, seat 24 has a first side defined by an annular ridge 27 defined by an inclined surface 28 tapered towards the mouth portion 22 and a cylindrical surface 19 arranged on the opposite side of the mouth portion 12 with respect to the inclined surface 28. Seat 24 further has a second side facing the first side and defined by a cylindrical annular ridge 30 having the same diameter as the cylindrical surface 19.

The annular ridge 25 and the annular ridge 26 are preferably identical and each has an inclined surface 31 tapered towards the mouth portion 22 and a cylindrical surface section 32 having the same diameter as the maximum diameter of the inclined surface 31.

The maximum diameter of the ridges 25, 26 is preferably larger than the diameter of the cylindrical surfaces 29, 30.

Furthermore, the annular ridges 25, 26 are axially spaced from a cylindrical surface 33 having a diameter larger than the diameter of the bottom of seat 24 and an axial length longer than the length of a clamp.

When pipe 7 is driven onto the end portion 21, being either single-layered or multilayered, it preferably has a radial stiffness higher than 25 N/mm^2, more advantageously higher than 50 N/mm^2, and even more advantageously between 100 and 125 N/mm^2, and such a value may be obtained either by means of a single layer of material or by means of multi-layer materials. In order to allow a correct coupling with the pipe having such a stiffness, given 'D' the diameter of the cylindrical surface 22 and 'd' the inner diameter of the pipe 7, the diameter of the cylindrical surface 22 advantageously meets the following relation:

$$1.25d < D < 1.38d.$$

Advantageously, the inner diameter 'd' is between 6 and 17 mm.

In particular, in order to obtain the radial stiffness value of the pipe, a test is carried out which consists in cutting a 100±1 mm section of the pipe and in arranging such a section on a dynamometer which compresses the pipe between two flat faces at a speed of 25 mm/min. The test ends when the two faces are spaced apart by half the outer diameter of the undeformed pipe. The force thus indicated by the dynamometer is divided by the transversal area of the pipe wall.

According to an embodiment, pipe 7 consists of a single layer comprising polyamide 6.10 not filled with glass fibers as described in the previous paragraphs, and preferably has a thickness between 1.5 and 3 mm.

The combination of a pair of radial ridges 25, 26 and seat 24 for a seal ring provides an adequate fluid-tightness for a high pressure application. In particular, the seal ring effectively avoids leakages following a relative rotation of the joint with respect to the pipe and the radial ridges 25, 26 ensure a hold which allows to pass the extraction and burst tests.

According to a preferred embodiment, the cylindrical surfaces 32 have an axial length of less than 0.15 mm. Thereby, the ridges 25, 26 ensure an effective tightness and hold against the wall of the pipe made of thermoplastic material, so that the extraction load meets the requested requirements. Such a value is indeed the compromise between the opposite needs to "bite" the thermoplastic material of the pipe without damaging it, so that the burst and extraction tests are passed.

The cylindrical surface 33 preferably has an axial length longer than double the axial length of the inclined surface 31. Even more preferably, the length of the cylindrical surface 33 is more than 3.5 times the length of the inclined surface 31. For example, the length of the cylindrical surface 31 is at least 6 mm, preferably more than 7 mm.

Thereby, a clamp may be used as a further restraining means for the pipe onto the end portion 21. Furthermore, the thermoplastic material of the pipe has enough room to radially relax between ridge 25 and ridge 26 thus increasing both fluid-tightness and hold.

The invention claimed is:

1. A coolant adducting assembly for the climate control system of a vehicle,
    characterized in that it includes a joint and a pipe connected to said joint, wherein said pipe and joint comprise a thermoplastic material and said joint includes an insert made of a more rigid material than said thermoplastic material and having an anchoring portion co-moulded into said joint and a connecting portion exiting said joint and suitable for being firmly connected to a device, and a seal ring surrounding said insert, whereas said joint includes a body of said thermoplastic material and that said body defines a seat for said seal ring; and said seat is downstream of a point where a first leakage path running along an interface between said anchoring portion and said body up to an abutment of said body and a second leakage path running from a head of said connecting portion to said seal ring meet;

wherein said connection portion is threaded and a pressure sensor compresses said seal ring when screwed on said connection portion.

2. An adducting assembly according to claim 1, characterized in that said anchoring portion has a non-circular cross section.

3. An adducting assembly according to claim characterized in that said insert defines a fluid channel.

4. An adducting assembly according to claim 1, characterized in that said thermoplastic material is a polyamide.

5. An adducting assembly according to claim 4, characterized in that said thermoplastic material is a polyamide 6.10.

6. An adducting assembly according to claim 4, characterized in that said pipe consists of a single layer of polyamide 6.10.

7. An adducting assembly according to claim 1, characterized in that said joint comprises the same thermoplastic material as the outermost layer of said pipe.

* * * * *